Jan. 26, 1932.  W. H. ROBERTSON  1,842,950
CASH REGISTER
Filed March 24, 1928  5 Sheets-Sheet 1
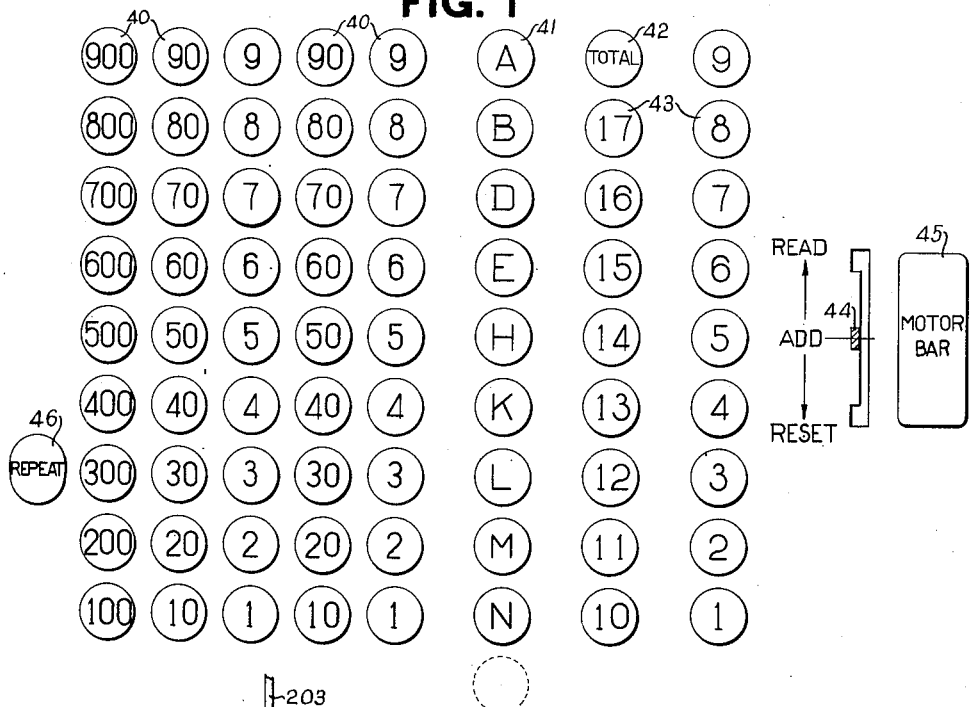
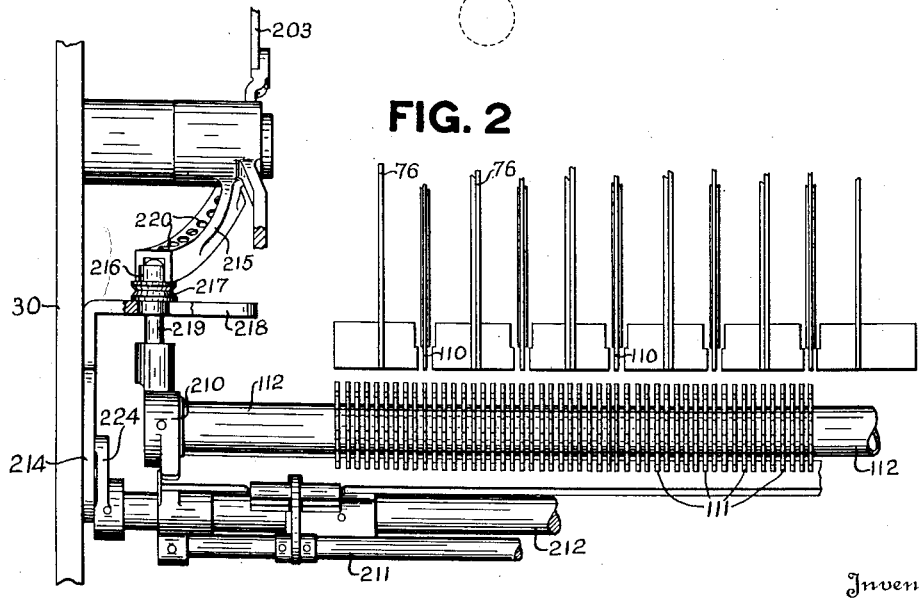
Inventor
William H. Robertson
By
His Attorneys Jan. 26, 1932.  W. H. ROBERTSON  1,842,950
CASH REGISTER
Filed March 24, 1928  5 Sheets-Sheet 2

Jan. 26, 1932. W. H. ROBERTSON 1,842,950
CASH REGISTER
Filed March 24, 1928 5 Sheets-Sheet 3

Inventor
William H. Robertson
By
His Attorneys

Jan. 26, 1932. W. H. ROBERTSON 1,842,950
CASH REGISTER
Filed March 24, 1928 5 Sheets-Sheet 4

Inventor
William H. Robertson
By Karl Beust
Ralph E. Warfield
His Attorneys

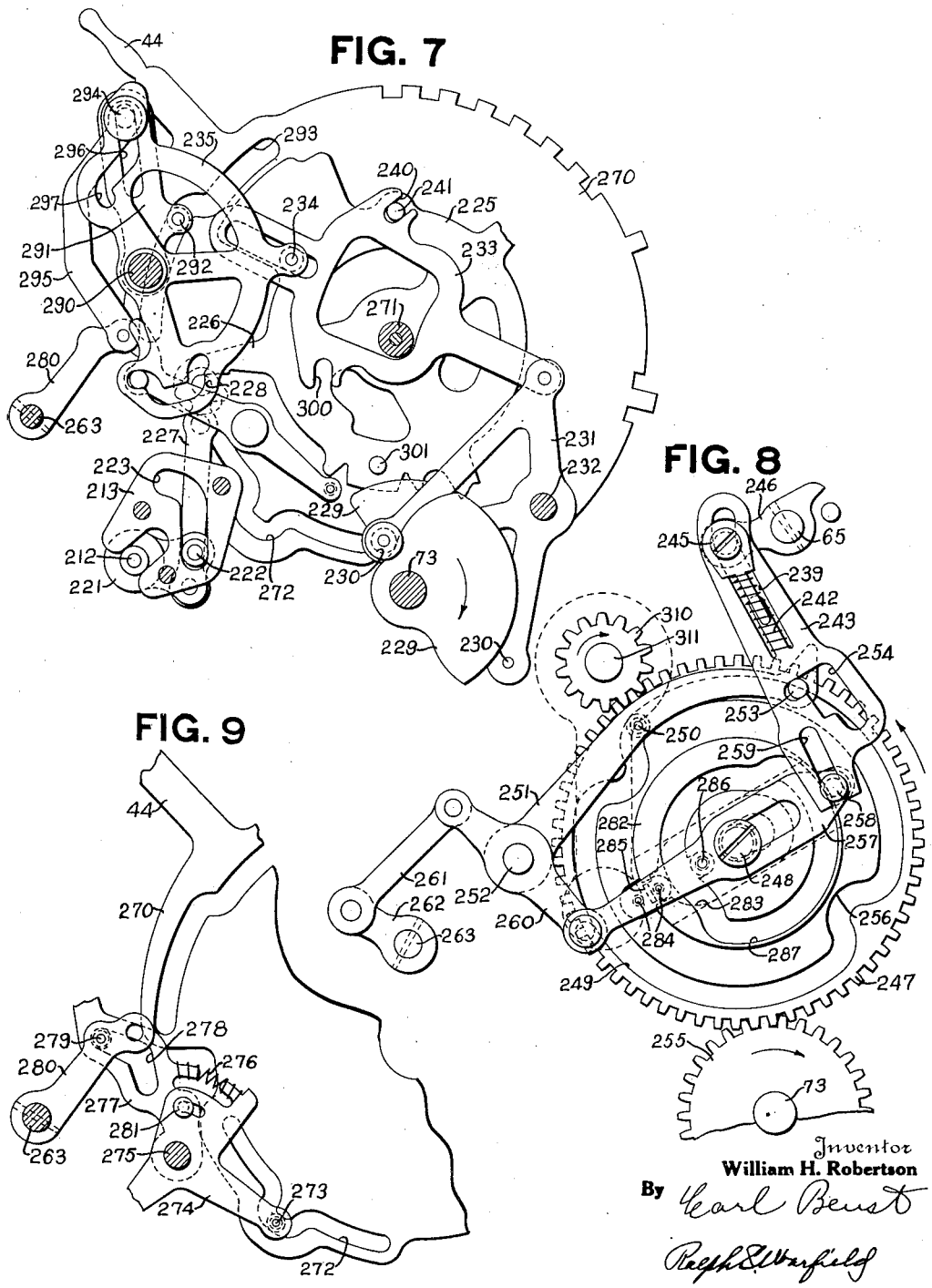

Patented Jan. 26, 1932

1,842,950

UNITED STATES PATENT OFFICE

WILLIAM H. ROBERTSON, OF DAYTON, OHIO, ASSIGNOR TO THE NATIONAL CASH REGISTER COMPANY, OF DAYTON, OHIO, A CORPORATION OF MARYLAND

CASH REGISTER

Application filed March 24, 1928. Serial No. 264,412.

This invention relates to cash registers and similar machines, and more particularly to improvements in repeat mechanisms for such machines.

The invention is conveniently shown applied to a machine of the type illustrated and described in Letters Patent of the United States, No. 1,242,170, issued to F. L. Fuller, on October 9, 1917, and No. 1,619,796, issued to B. M. Shipley, on March 1, 1927.

One object of this invention is to provide a novel means whereby either an item just previously set up on the keys and already entered upon a totalizer, or an amount accumulated on the totalizer, may be again registered upon the same or any other totalizer in the machine, upon the subsequent operation of the machine.

Another object is to provide novel means for accomplishing the transfer of an amount from any one of a plurality of totalizers on a common axis to any other totalizer on the same axis.

Another object is to provide novel mechanism whereby, after a plurality of differentially adjustable members have been adjusted under control of the amount keys, said differentially adjustable members may be locked in their adjusted positions to act as stops for the totalizer actuators upon subsequent operations of the machine.

With these and incidental objects in view, the invention consists of certain novel features of construction and combinations of parts, the essential elements of which are set forth in appended claims and a preferred form or embodiment of which is hereinafter described with reference to the drawings which accompany and form a part of this specification.

Of said drawings:

Fig. 1 is a diagrammatic view of the keyboard of a machine equipped with this invention.

Fig. 2 is a fragmentary view of a part of the totalizer selecting mechanism.

Fig. 7 is a detail side view of the totalizer engaging and controlling mechanism.

Fig. 8 is a detail side view of a part of the mechanism for controlling the machine for total and subtotal taking operations.

Fig. 9 is a fragmentary view showing a part of the mechanism adjusted by the total control lever.

General description

Figure 3:
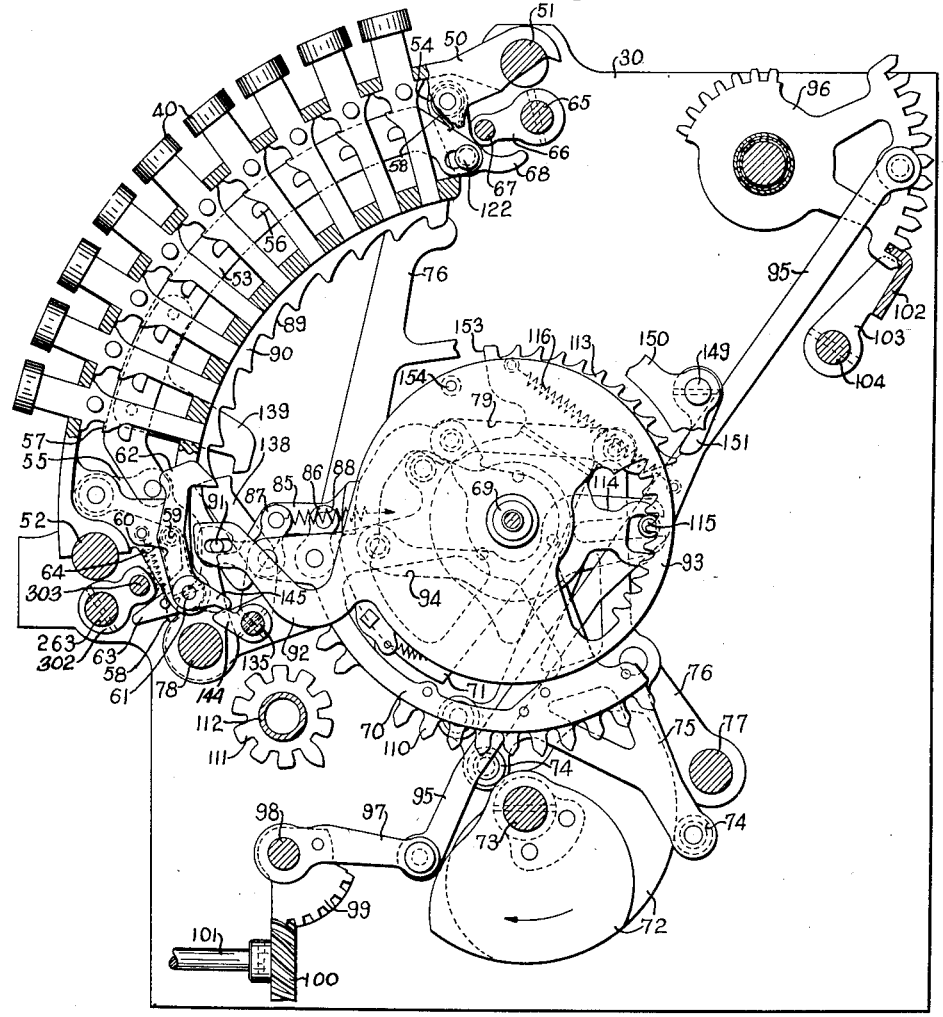
Fig. 3 is a sectional view through the machine, showing in elevation, the lowest order bank of amount keys.

The machine to which the present invention is shown applied includes, generally, a plurality of banks or rows of depressible keys mounted in key frames removably supported upon cross rods extending between the side frames of the machine, only one of which side frames is shown herein.

Associated with each of the banks of keys is a differential mechanism controlled by the keys for the purpose of adjusting various elements of the machine, including the totalizer actuators.

Included in the machine is a plurality of interspersed totalizers, all of which are mounted on a common axis. The selection of the particular totalizer desired is accomplished differentially under control of the clerks' keys.

Specifically, the present invention includes the adaption of a novel repeat mechanism to a type of machine well known in the art. The depressed amount keys, representing the item to be entered in the selected totalizer, are released near the end of the operation of the machine. Hertofore, in order to repeat an amount registered on a totalizer, it was necessary to again set up the amount on the keyboard by depressing the corresponding keys, or to depress a repeat key prior to the depression or at least prior to the operation of the machine after the amount keys were depressed.

This former repeat key commonly disabled the mechanism whereby the depressed amount keys were released for restoration near the end of the operation.

The retention of the amount keys in depressed position was necessary in order to control the adding racks by which the amounts were accumulated on the totalizer.

The present invention removes the control of the adding racks from the keys, in repeat operations, so that the keys restore to normal during the first operation of the machine, it being possible to repeat the registration of the last entry by merely depressing a repeat key.

It is not necessary for the operator to know before hand that it is desired to repeat an operation. For instance, if clerk "A" has registered a sale of twenty dollars, this amount, during the operation, will be displayed on the indicators and will be printed on the record strip. Assuming the next sale of clerk "A" to be for the same amount, he will note by glancing at the indicator, that the last registration was for twenty dollars. He, therefore, depresses his initial key and the repeat key, without depressing any amount keys, whereupon another amount of twenty dollars will be accumulated on the totalizer selected under control of the depressed clerk's key.

Obviously, cash registers and similar machines equipped with this feature, are especially adapted for places of business wherein an indefinite number of successive entries of the same amount may occur.

Another advantage of this invention resides in its ability, by use of the repeat key, to transfer a total or a sub-total amount from any one of the totalizers to any other totalizer on the same line or axial support. To do this, the total is taken in the regular way, that is, the total control lever is adjusted to the "read" or "reset" position, and the clerk's key corresponding to the totalizer from which it is desired to take the total or sub-total, is depressed. The machine is then operated, whereupon the amount on the totalizer selected will be removed and the totalizer left at zero, in total taking operations, or in sub-totaling operations, the total is taken from the totalizer, placed upon the indicators and type wheels, and then replaced upon the totalizer in a manner well known in the art.

By the present invention, it is only necessary, after either of the above operations have been completed, to restore the total control lever to its "add" position, and then to depress the clerk's key corresponding to the totalizer to which it is desired to transfer the total or sub-total amount just previously handled, and depress the repeat key. Upon operation of the machine, the total will be registered upon the selected totalizer.

Mechanism for attaining the above objects and advantages will now be described.

*Keyboard*

Figure 6:
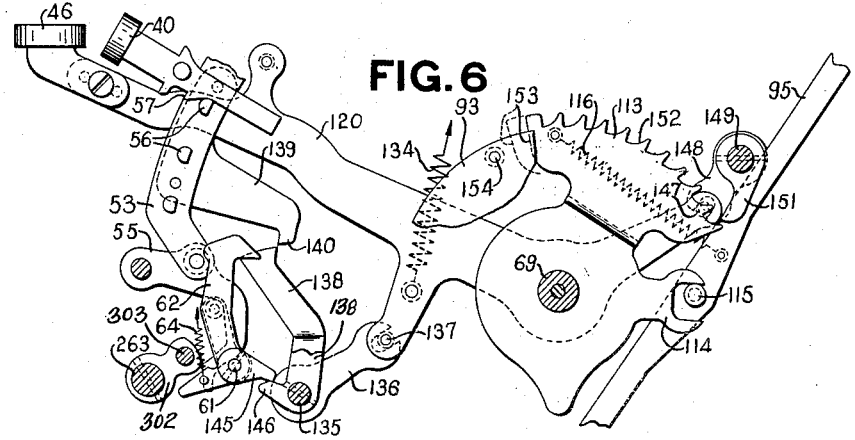
Fig. 6 is a similar view of the repeat key and a part of the mechanism adjusted thereby.

The keyboard of the machine to which this invention is shown applied is, generally, the same as those disclosed in the previously mentioned patents, and includes a plurality of banks of amount keys 40 (Figs. 1 and 3), a bank of clerks' keys 41 (Figs. 1 and 4), a bank containing the total key 42 (Fig. 1), and a plurality of department symbol keys 43, a second bank of department symbol keys 43, a total control lever 44, a motor release bar 45, and a repeat key 46 (Figs. 1, 6 and 7).

*Amount keys*

The amount keys 40 (Figs. 1 and 3) of each row are slidably mounted in a denominational key frame 50, supported in the machine by rods 51 and 52 mounted in side frames 30, one only of which is shown. A detent bar 53, pivotally supported at its upper and lower ends by links 54 and 55, carries a plurality of detent studs 56 projecting laterally therefrom, one adjacent each of the key stems 40. A shoulder 57 on each of the key stems catches beneath its corresponding stud 56 when its key is depressed.

Depression of one of the keys 40 shifts the detent bar 53 downwardly until the shoulder 57 on the key has passed below its stud 56, whereupon a spring 64 restores the detent bar to engage the stud 56 with the shoulder 57 on the depressed key and retain the key depressed.

The free end of the lower link 55, is extended to form a hook which contacts a pin 59 carried by an arm 60 pinned to one end of a stub shaft 61 journaled in a lug depending from the key frame 50. The stub shafts 61 are individual to the separate key frames. Pinned to the opposite end of each of the stub shafts 61 is a zero stop pawl 62. A spring 64 connected to a tail 63 on the arm 60 tends to hold the zero stop pawl 62 in the path of the differential member corresponding with its bank of keys, as will be hereinafter explained.

The detent bar 53, on its downward travel, rocks the link 55 clockwise and causes the hooked end of the link to rock the arm 60 and shaft 61 clockwise, thereby rocking the zero stop pawl 62 counter-clockwise to its ineffective position out of the path of the corresponding differential member.

Near the end of an item entering operation, the depressed amount keys 40 are released from their detent bars 53 and returned to their normal positions by springs, not shown herein. Arms 66 projecting from a release shaft 65 journaled in the side frames 30 of the machine, carry a rod 67 lying adjacent to tails 68 projecting rearwardly from the upper links 54 supporting the upper ends of the detent bars 53 for the several amount banks. Near the end of each operation, the release shaft 65 is rocked first counter-clockwise and then back to its normal position by mechanism hereinafter to be described. The shaft 65 on its counter-clockwise movement presses the rod 67 against the tails 68, to rock the links 54 clockwise. For each bank of keys 40 there is a spring 58, each of which is attached, at one end, to its associated link 54, and is wound around the supporting stud for each link 54, the other end of each spring 58 bearing against the corresponding detent bar 53. The springs 58 normally hold studs 122 in the right-hand ends (Fig. 3) of the slots in the detent bars, thus forming loose connections between the links 54 and detent bars 53, to delay the releasing movement of the detent bars 53 for a purpose hereinafter described. When the shaft 65 rocks the links 54 clockwise, the springs 58 are tensioned, and therewise after when the detent bars 53 are free to move, the springs 58 lower the detent bars 53. As the detent bars are lowered, the studs 56 are disengaged from the shoulders 57 on the depressed keys 40, which then return to normal positions.

Amount differential

A differential mechanism is provided for each bank of amount keys. This mechanism includes a differential member 70 (Fig. 3) pivoted on a stud 69 projecting from a hanger 76, of which there is one for each differential member. The differential member 70 is variously positioned under control of the amount keys 40, by a driving segment 71, which is given a regular excursion at each operation of the machine. A pair of cams 72, on the main drive shaft 73 of the machine, cooperates with rollers 74, carried by a multiple-armed lever 75 pivoted on the hanger 76 mounted in the machine on rods 77 and 78. A link 79 connects the upper end of the lever 75 to the driving segment 71.

The drive shaft 73, driven by any suitable means, makes one clockwise rotation at each operation of the machine. The cams 72, through lever 75 and link 79, rock the driving segment 71 first clockwise and then counter-clockwise to its normal position at each operation of the machine. A latch 85 pivotally supported on a link 86, and on a bell crank 87 mounted on the differentially adjustable member 70, has a foot at its inner end normally held in engagement with a shoulder on the driving segment 71 by a spring 88. The driving segment 71, on its clockwise travel, carries the differential member 70 along until the projecting arm of the bell crank 87 strikes the end of a depressed key 40, whereupon the latch 85 is disconnected from the driving segment 71, and a nose thereon enters a notch 89 in a notched plate 90 secured at its upper end to the hanger 76, and at its lower end to the rod 78. A lateral stud 91 mounted in the projecting arm of the bell crank 87, extends through a slot in a finger 92 projecting from a substantially circular reset disk 93 journaled on the stud 69 beside the differential member 70.

This finger 92 lies in the same plane with the zero stop pawl 62. When no key is depressed in an amount bank, the end of the finger 92 of the reset disk 93 contacts the zero stop pawl and disconnects the latch 85 from the segment 71, thus arresting the differentially movable member 70 in its zero position.

To adjust other elements of the machine, such as the indicators and the printing mechanism, a beam 94 (Fig. 3) is pivoted on the differential member 70. The beam 94 is bifurcated at its rear end to embrace a stud in a differential link 95. This differential link is pivoted at its upper end to a segment 96 provided for the purpose of adjusting the indicators to correspond with the values of the depressed keys, there being as many segments 96 as there are differential members 70. The lower end of the link 95 is pivoted to an arm 97 journaled on a shaft 98, to which arm is rigidly secured a spiral segment 99 which meshes with a spiral pinion 100. Each pinion 100 is pinned on a shaft 101 which shafts extend into the printer to set up the type wheels to positions corresponding to the value of the keys depressed.

An aliner 102 cooperates with teeth formed on the several indicator segments 96 to align the mechanism just described and to retain the differential members 70 in their adjusted positions. The aliner 102 extends across the machine and engages all of the segments 96, one of which is provided for each bank of keys. The aliner is carried by a plurality of arms 103 pinned to a shaft 104 supported in the side frames of the machine. The shaft 104 is operated from the main drive shaft 73 by any suitable means, a preferred form of which is described in the above mentioned patent to Shipley, No. 1,619,796.

The differentially movable members 70 carry actuator racks 110 with which the totalizer pinions 111 engage and disengage, these pinions being individually journaled on a hollow shaft 112, later to be described. After the actuator racks 110 have been moved under control of and arrested by the depressed keys 40, as described above, the totalizer pinions 111 engage the racks 110, after which the racks are restored to normal positions, adding onto the totalizer pinions an amount equal to the value set up on the keyboard. The totalizer pinions then disengage from the racks.

Repeat key

Figure 5:
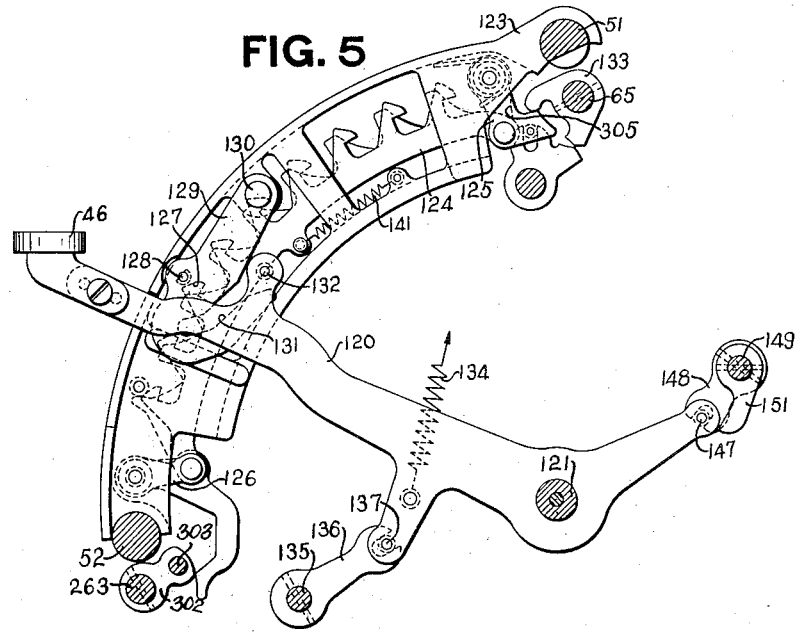
Fig. 5 is a detail side view of the repeat key and a part of its associated mechanism.

The repeat key 46, shown in Figures 1, 5 and 6, is depressed when it is desired to repeat the preceding operation, that is, when it is desired to again add the last amount entered in the machine, or transfer an accumulated amount from one totalizer to another.

In adding operations, the differential links 95, indicator segments 96, printer shafts 101, and the other mechanisms associated therewith, are adjusted during the operation of the machine, to positions corresponding to the values of the keys depressed. So, also, in total or sub-total taking operations, the differential links 95 and associated mechanisms are adjusted in correspondence with the amount of the total or sub-total on the totalizer. These parts are left alined in their adjusted positions at the end of the operation, and until the differential members 70 (Fig. 3) shift to other positions on the following operation.

Taking advantage of this condition in the machine, this invention provides an adjustable stop sector 113 (Figs. 3 and 6) journaled on the stud 69 adjacent each differential member 70. A forked arm 114 projecting from each stop sector 113 straddles a stud 115 on its corresponding differential link 95 which, it will be remembered, is adjusted by the differential member 70, and remains where adjusted until the next operation. Consequently, the stop sectors 113 will be adjusted at each operation of the differential members 70, and will remain in the positions to which they have been adjusted until the next operation of the differential members to different positions.

A spring 116 stretched between the differential link 95 and the corresponding stop sector 113 holds the upper prong of each forked arm 114 in contact with its stud 115, whereby the stop sectors are caused to be adjusted in consonance with the differential members 70, at the same time that the indicating and printing mechanisms are adjusted.

Depression of the repeat key 46 adjusts means to lock the stop sectors 113, (one for each bank of amount keys), in the positions to which they were last adjusted to arrest the differentially movable members 70 on the succeeding operation, at the same positions in which they were arrested by the depressed amount keys on the preceding operation without necessitating the depression of the amount keys, which were released near the end of the preceding operation. Similarly, the stop sectors 113 may be locked in the positions to which they were adjusted on total and sub-total taking operations.

One of the novel features of the present invention is the device for locking the differential stop sectors 113 in the positions in which they were adjusted on the preceding operation, so as to arrest the differential members 70 at the same positions on the next operation of the machine.

The repeat key lever 120 (Figs. 5 and 6) carries a stud 147 embraced by the bifurcated end of an arm 148 pinned to a shaft 149. A plurality of ears 150 (Fig. 3) fast on the hanger 76, support the shaft 149. The shaft 149 carries a plurality of locking arms 151, one opposite each of the stop sectors 113.

Depression of the repeat key 46 against the tension of its restoring spring 134, rocks the repeat lever 120 counter-clockwise, which, through the stud 147, rocks the arm 148, shaft 149, and the locking arms 151 clockwise. As the locking arms 151 are rocked clockwise, the ends thereof will engage notches 152 in the stop sectors 113 to rock these sectors slightly clockwise and lock them in such positions.

Upon operation of the machine, the drive segment 71 (Fig. 3), through the latch 85, rocks the differential member 70 upwardly, which, through the stud 91 and bell crank 87, carries the disk 93 with it until a stud 154 in the disk 93 contacts the forward edge 153 of the stop sector 113, to arrest the disk 93 and disconnect the latch 85 from the segment 71, as described above. If the stop sector 113 is locked in its zero position the latch 85 will be disconnected when the differentially movable member 70 reaches its zero position. If on the preceding operation, the stop sector 113 was differentially adjusted to its "7" position, and before the beginning of the next operation, the repeat key 46 is depressed, the stop sector 113 will be locked in its "7" position, and, when the machine is operated, will arrest the differential mechanism in the "7" position. After the latches 85 have been disconnected from their driving segments 71 by contact of the studs 154 in the disks 93 with the variously positioned differential stop sectors 113, the totalizer pinions 111 shift into engagement with the actuator racks 110 on the differential members 70, after which the racks are restored to their normal positions, thus adding onto the totalizer the amounts represented by the positions of stop sectors 113.

In order to prevent the repeat mechanism from in any way interfering with the proper operation of the machine when adding a series of non-repeated amounts set upon the keyboard, the stop sectors 113 (Fig. 3) are so assembled relatively to the stop studs 154 on the reset disks 93 associated with the differential members 70, that the forward edges 153 of the stop sectors 113 have a lead over the stop studs 154 to prevent contact of the studs with the sectors.

This lead is shown in Fig. 6, the lead being equal to the distance between the dotted line and the full line position of the forward edge 153 of the sector 113. The distance between the stud 154 and the dotted line position of the edge 153 of the stop sector 113, is taken up when the reset disk moves from its normal position to its zero position, whereupon the beam 94 begins to move the link 95 and the spring 116 begins to move the sector 113. The lead is maintained by the springs 116 which advance the stop sectors 113 as the reset disks 93 advance in key-controlled adding operations. The differentially adjustable links 95, which control the advance of the stop sectors 113, shift with the differential members 70. Hence in key-controlled adding operations, the studs 154 cannot catch up with the stop sectors 113.

However, in repeat operations, or in transferring accumulated amounts from one totalizer to another, it is necessary that the stop sectors 113 coact with the stop studs 154, and for this reason, a loose connection between the stop sectors 113 and the differentially adjustable links 95 is provided, i. e., the clearance between the prongs of the forked arms 114 embracing the pins 115 on the differential links 95, which loose connection permits a relative movement between the differential links 95 and the stop sectors 113 corresponding substantially with the lead between the stop studs 154 and the forward edges 153 of the stop sectors 113.

Consequently, the locking arms 151 engage one or another of the notches in the stop sectors 113 to rock the stop sectors counter-clockwise so as to eliminate the above described lead (Fig. 6), between the forward edges 153 of the stop sectors 113 and the stop studs 154.

In machines of the type selected for illustration, the differential members 70 and their associated parts are normally positioned at points below the "zero" position, when the machine is at rest.

Figure 4:
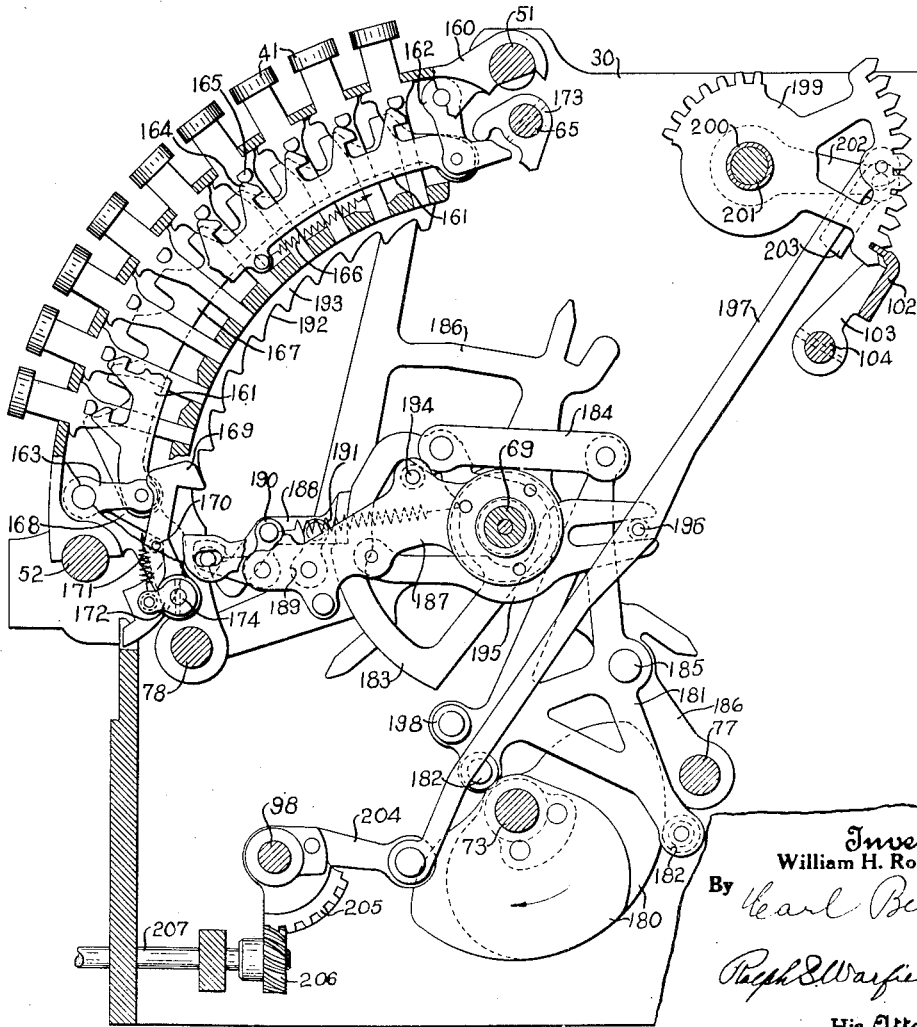
Fig. 4 is a sectional view through the machine, showing in elevation, one of the banks of clerks' keys.

Therefore, assuming the parts to be in the positions shown in Fig. 3, the repeat key 46, when depressed, rocks the locking arms 151 into contact with the stop sectors 113 to rock the latter counter-clockwise and take up the lead between the forward edges 153 of the stop sectors and the stop studs 154.

Upon operation of the machine, the differential mechanisms will rock clockwise until the arms 92 of the disks 93, arrive at the points where they would contact the zero-arresting pawls 62 if the latter were in their effective positions, at which points the stop studs 154 strike and are arrested by the forward edges 153 of the stop sectors 113.

From this it will be seen that the counter-clockwise travel of the stop sectors under the influence of the locking arms 151 is sufficient to take up the lead only between the forward edges 153 of the stop sectors and the stop studs 154, and not the entire distance.

After the repeat key 46 is released, the spring 134 restores the repeat lever 120 to its normal position, and in so doing, rocks the arm 148, shaft 149 and locking arms 151 counter-clockwise to their normal positions, shown in Figs. 6 and 7. When this occurs, the springs 116 stretched between the stop sectors 113 and the differentially adjustable links 95 return the stop sectors 113 to their normal positions, as shown in Fig. 6.

The repeat key 46 (Figs. 5 and 6) is mounted on the outer end of the lever 120 pivoted on a stud 121 projecting from a hanger, similar to the hangers 76, which carry the studs 69 (Fig. 3).

When the repeat key is depressed, it is desirable to retain it in depressed position during the operation of the machine. One convenient means to effect this result is as follows:

Adjacent the repeat lever 120 (Fig. 5) is a key frame 123 similar to the key frame 50 and similarly mounted on the rods 51 and 52.

A detent bar 124 pivotally mounted in the repeat key frame 123 on links 125 and 126, has a plurality of hooks formed thereon, one of which, 127, lies in the path of a stud 128 mounted in a retaining arm 129 pivoted on a pin 130 carried by an ear on the key frame 123. The retaining arm 129 has a cam slot 131 formed therein to accommodate a stud 132 on the repeat lever 120. Upon depression of the repeat key 46, the stud 132 traverses the cam slot 131 and, due to the shape of this slot, rocks the retaining arm 129 counter-clockwise. This movement of the arm 129 forces the stud 128 into contact with the beveled end of the hook 127 and shifts the detent bar 124 downwardly against the tension of a restoring spring 141, which, after the stud 128 has passed below the shoulder of the hook 127, returns the detent bar to its normal position, to lock the retaining arm 129 and the repeat lever 120 in depressed position.

It will be recalled that the release shaft 65 is rocked clockwise near the end of the operation of the machine for the purpose of releasing the depressed keys. Pinned to the release shaft 65 is an arm 133 having a finger thereon adapted, when the release shaft 65 is rocked counter-clockwise, to contact a tail formed on the upper link 125 supporting the detent bar 124, and rock this link clockwise to shift the detent bar downwardly, and cause it to disengage its detent hook 127 from the stud 128 in the retaining arm 129, whereupon the spring 134 restores the repeat lever 120 to its normal position. As the repeat lever returns to normal, its pin 132 returning along the cam slot 131, restores the retaining arm 129 to its normal position. Spring 141 restores the detent bar 124 to its normal position when the release arm 133 and its shaft 65 return to normal.

*Interlock between the repeat and amount keys*

An interlock prevents manipulation of the repeat key 46 after an amount key 40 has been depressed, and vice versa. This interlock includes a shaft 135 (Figs. 3 and 6) journaled in the hangers 76 for the amount banks and the hanger, which supports the repeat key lever 120. An arm 136 (Fig. 6), one end of which is fast to the shaft 135, is bifurcated at its opposite end to embrace a stud 137 projecting from a downwardly extending finger on the repeat lever 120. The shaft 135 also has a plurality of locking arms 138 pinned thereto, one opposite each amount bank. A locking plate 139 fast on each of the detent bars 53 for the respective amount banks, has a nose 140 shaped to cooperate with the upper end of the corresponding locking arm 138. An amount key 40, when depressed, shifts its detent bar 53 downwardly to position the nose 140 of its locking plate 139 in the path of the locking arm 138 to prevent clockwise movement of the locking arm and the shaft 135.

Referring to Fig. 6, it can be seen that with the shaft 135 and its connected arm 136 held against clockwise movement, it will be impossible to move the repeat key 46 and lever 120 downwardly, due to the connection between the stud 137 on the lever 120 with the arm 136.

This interlock also acts to prevent depression of the amount keys 40 after the repeat key 46 has been depressed. Depression of the repeat key 46 rocks the arm 136, shaft 135 and locking arms 138 clockwise to position the upper ends of the locking arms 138 in the paths of the noses 140 on the locking plates 139. It can be seen that with the locking arms 138 in such positions, it will be impossible to shift the detents 53 downwardly, thus locking the amount keys 40 against depression.

Since the repeat key 46 is not released from depressed position until after the counterclockwise swing of the release rod or bail 67 (Fig. 3) near the end of the operation, means must be provided to permit the links 68 to yield relatively to the detent bars 53, which at this time are locked by the arms 138 and plates 139, to which end the links 68 and detent bars 53 have slot and pin connections 122, springs 58 operating on the links 68 to hold the pins normally at the upper ends of the slots.

The zero stop pawl 62 (Fig. 3) is normally rocked to its ineffective position by depression of an amount key 40. On a repeat operation, however, no amount key is depressed, and since it is necessary for the differentially movable member 70 to rock upwardly until arrested by the differentially adjustable stop sector 113, other means is provided to rock the zero stop pawl 62 to its ineffective position on repeat operations.

Each shaft 61 (Figs. 3 and 6) except that associated with the "cents" bank (Fig. 3), which carries the zero stop pawl 62, also carries an arm 145 lying in the same plane with a finger 146 projecting from each of the locking arms 138. Owing to the structural relation of the various elements of the differential, the detent bar 53 and the arm 145, it is necessary to arrange the fingers 146, so that the finger 146 on the locking arm 138 for the "cents" bank lies in the plane of the arm 145 for the "dimes" bank; the finger 146 on the arm 138 for the "dimes" bank lies in the plane of the arm 145 for the "dollars" bank; and so on through to the highest value bank. For this reason it is necessary to provide a special finger 144 (Fig. 3) fast on the shaft 135, but which is not on any stop arm 138, to rock out the zero stop pawl 62 for the "cents" bank. Depression of the repeat key 46 rocks the locking arms 138 clockwise and the fingers 146 and 144 contact the arms 145 and rock the arms and the zero stop pawls 62 counter-clockwise to retain them in idle positions until the repeat lever restores to normal.

Near the end of the operation of the machine, the repeat key 46 is released. The spring 134, which restores the repeat key to its normal position, will cause the repeat key lever 120, through its connection with arm 136, to rock the shaft 135, arms 138, and fingers 144 and 146 counter-clockwise, whereupon the springs 64 rock the zero stop pawls 62 clockwise to normal position.

*Clerks' keys*

The clerks' keys 41 (Figs. 1 and 4) are mounted in a key frame 160, similar to the key frame 50 (Fig. 3) for the amount keys. The key frame 160 is supported on the cross rods 51 and 52, previously mentioned. A locking detent bar 161 is swung on links 162 and 163, pivoted in the frame 160. This detent bar lies alongside of the clerks' keys 41, and is provided with a plurality of hooks 164, one opposite each of the keys 41. Upon depression of a key 41, a stud 165 mounted in the stem thereof contacts the beveled edge of the corresponding hook 164 and cams the detent bar 161 downwardly until the flat face of the pin 165 has passed the shoulder on the hook, whereupon a spring 166, attached to the detent bar 161, returns the detent bar to its normal position, to retain the key 41 depressed. The keys 41 also operate a control bar 167 arranged beside the detent bar 161 and similarly swung from links, one of which is shown at 168. The upper edge of the control bar 167 is provided with a series of beveled surfaces, one adjacent each key pin 165 in the clerks' bank, for the purpose of moving a zero stop pawl 169 for the clerks' bank to its ineffective position upon depression of one of the keys 41.

Depression of one of the keys 41 forces the key pin 165, which projects through the key stem, into contact with the corresponding beveled surface on the control bar 167 to cam this bar downwardly and rock the link 168 clockwise about its pivot. Due to the engagement of the link 168 with a pin 170 in the zero stop pawl 169 for the clerks' bank, this pawl will be rocked counter-clockwise to its ineffective position. A spring 171 connected to an arm 172, pinned to a short shaft 174, to which the zero stop pawl 169 is secured, tends to hold the zero stop pawl 169 in and restore it to its normal position upon release of the key 41.

To release the clerks' keys 41, the release shaft 65, heretofore described, carries an arm 173, having a finger thereon adapted to engage a tail formed on the link 162 to rock the link clockwise about its pivot and lower the detent bar 161, thus disengaging the hook 164 from the key pin 165, whereupon a restoring spring (not shown) returns the depressed key to its normal position.

Clerks' differential mechanism

The bank of clerks' keys controls a differential mechanism, similar to the differential mechanism disclosed in Fig. 3 for the amount bank. A pair of cams 180 pinned to the main drive shaft 73, drives a lever 181 having the rollers 182. The lever 181 drives a segment 183, through a link 184 connecting the upper end of the lever 181 to the drive segment 183. The drive segment 183 is thereby given a regular excursion first clockwise and then back to normal on each operation of the machine. The lever 181 is pivoted on a stud 185 mounted in a hanger 186, similar to the hangers 76 for the amount banks, and mounted on the fixed rods 77 and 78, previously mentioned. The differentially movable arm 187 pivoted on the stud 69 for the clerks' bank, carries a latch 188 shiftably mounted thereon by a link 189 and a bell crank 190. A spring 191 normally holds the foot of the latch 188 in engagement with a shoulder formed on the drive segment 183. On its upward movement, the drive segment 183 carries the latch 188 and the arm 187 with it until the forwardly extending arm of the bell crank 190 contacts the inner end of a depressed key 41. Thereupon the bell crank 190 rocks counter-clockwise and disengages the latch 188 from the shoulder on the drive segment 183, at the same time the nose of the latch 188 engages one of a plurality of notches 192 formed in a plate 193 supported on the rod 78 and the hanger 186. The drive segment 183 continues its clockwise excursion, and on its return, a formed portion of the inner periphery thereof contacts a stud 194 mounted in the differential arm 187 and returns this arm to its normal position.

A beam 195, pivoted at its forward end to the differential arm 187, is slotted at its rear end to embrace a stud 196 mounted in a differential link 197. As the differential arm 187 rocks upwardly, it carries with it the pivoted end of the beam 195 until the beam strikes the pivot 69, whereupon the differential link 197 will be adjusted to a position corresponding to that of the depressed key. To assist in the adjustment of the beam 195 and the differential link 197, the lever 181 carries a roller 198, which, when the lever rocks clockwise as above described, contacts the lower side of the beam 195, thereby insuring accurate adjustment of the beam, and consequently of the indicators and printing elements. The upper end of the differential link 197 is pivotally connected to a segment 199 fixed to one end of a tube 200 surrounding a shaft 201. The segment 199 has teeth formed therein with which co-operates the aligner 102, previously described. The differential arm 187 variously adjusts the segment 199 through the differential link 197. The opposite end of the tube 200 has fixed thereto an arm 202, from which depends a link 203 to control the selection of the totalizers, which will be hereinafter described. The lower end of the differential link 197 is pivotally secured to an arm 204 loosely mounted on the shaft 98. A spiral segment gear 205 secured to the arm 204, meshes with a spiral pinion 206 pinned to a printer shaft 207. It can be seen that the differential adjustment of the link 197 is communicated to the arm 204, which adjusts the segment 205, gear 206 and printer shaft 207 commensurate with the key 41 depressed. The printer shaft 207 extends into the printing mechanism to adjust type carriers, no description of which will be included herein, as they form no part of the present invention.

Totalizers and totalizer selection

There are ten totalizers in the particular machine herein illustrated, one of which is selected by each of the clerk's keys 41, and one selected by the zero stop pawl 169 (Fig. 4) for the bank of clerks' keys. This totalizer in the zero position is known herein as the grand totalizer.

The totalizers each include a plurality of pinions 111 (Figs. 2 and 3) mounted on the hollow shaft or tube 112. The totalizer pinions 111 are interspersed on the tube 112 in a plurality of groups, there being a group of pinions for each of the banks of amount keys 40. Arms 210 support the tube 112, one at each end thereof, only one of which is shown herein. A rod 211 extends between and connects the arms 210. The tube 112, arms 210 and rod 211 form a frame for the totalizer pinions 111, which is slidable transversely of the machine on a shaft 212 (Fig. 2) to enable the selection of any of the totalizers for engagement and disengagement relatively to the actuator racks 110. Guide plates 213 (Fig. 7) and 214 (Fig. 2), secured to the right and left side frames 30 respectively, support the shaft 212 in the machine.

A totalizer shifting cam 215 (Fig. 2) shifts the totalizer frame together with the totalizer pinions 111 longitudinally on the shaft 212. The link 203 (Figs. 2 and 4), previously described, adjusts the totalizer selecting cam 215 according to the particular clerk's key 41 depressed. A follower 216 (Fig. 2) fits within a channel formed in the cam 215. This follower carries a roller 217 which co-operates with a slot in a guide plate 218 supported on the left side frame 30 of the machine. A rod 219 fast in the arm 210 (Fig. 2) extends into the follower 216.

As shown in Fig. 2, the parts are all in their zero positions, that is, with the grand totalizer in line with the totalizer actuators 110. In adding operations, when the selecting cam 215 is adjusted as above described, the follower 216, rod 219 and the totalizer frame, are slid longitudinally along the shaft 212 to bring the desired totalizer 111 opposite the actuating racks 110, after which the selected totalizer is shifted in a radial direction to engage with the actuating racks 110, the racks having meanwhile advanced in correspondence with the keys depressed. As the selected totalizer 111 is moved into engagement with the actuator 110, the rod 219 is slid into one of a series of holes 220 formed in the cam 215, thereby aligning the totalizer against longitudinal movement while it is engaged with the actuator. The guide bracket 218 which guides the totalizer frame in its longitudinal movement, also prevents the frame from turning about the shaft 212.

*Totalizer engaging and disengaging mechanism*

The mechanism for engaging and disengaging the totalizers 111 with and disengaging them from their actuators 110, is the same as that shown and described in the patents above referred to. However, a brief description of this mechanism will now be given.

An arm 221 (Fig. 7) pinned to the one end of the shaft 212 carries a roller 222, traversing a cam slot 223 in the guide plate 213, previously described, secured to the right side frame of the machine. An arm 224 (Fig. 2) is pinned to the opposite end of the shaft 212, and has a roller (not shown) similar to the roller carried by the arm 221, and entered in a similar cam slot (also not shown) in the guide plate 214.

Referring to Fig. 7, it can be seen that counter-clockwise movement of the arm 221 will cam the arms 221, 224 and the shaft 212 towards the center of the machine due to the shape of the cam slots 223 in the guide plates 213, 214. The mechanism for rocking the arm 221 (Fig. 7) to engage the totalizers with the actuators, includes a spider 225 having a hooked arm 226 projecting therefrom. A link 227 pivoted at its lower end to the arm 221, carries a stud 228 resting in the hooked arm 226. The spider 225 is rocked by a pair of cams 229 pinned to the main drive shaft 73. These cams co-operate with rollers 230 carried on a lever 231. The lever 231 is pivoted on a stud 232, supported in the right side frame 30 of the machine. The cams 229 receive one clockwise rotation on each operation of the machine and, due to their configurations, rock the lever 231 first clockwise, and then counter-clockwise. The lever 231 when rocked clockwise, slides a pitman 233 pivotally connected to the upper end of the lever 231, to the right. The left-hand end of the pitman 233 is slidably supported on a stud 234 in an adjustable rocker 235, later to be described. A notch 240 formed in the upper edge of the pitman 233 normally engages a stud 241 on the spider 225, which controls the engagement of the totalizers 111 with, and their disengagement from, their actuators 110. As the pitman 233 shifts to the right, as above described, it rocks the spider 225 clockwise, and because of the engagement of the hooked arm 226 with the link 227, raises said link, to rock the arm 221 counter-clockwise, and engage the selected totalizer 111 with the actuators 110, as above described. As the drive cams 229 continue their clockwise movement, the lever 231 is rocked counter-clockwise and slides the pitman 233 to the left. The pitman 233 rocks the spider 225 clockwise to lower the link 227 and disengage the totalizers 111 from the actuators 110. The timing of the drive cams 229 is such that the totalizers will be engaged with the actuators after said actuators have been differentially adjusted under control of the amount keys and will be disengaged from the actuators after the actuators have been returned to their normal positions.

A suitable transfer or carrying mechanism, such as is shown in the patents hereinbefore referred to, is employed in this machine, and as in such patents, the tripped transfer devices are not restored to their normal positions until the beginning of the succeeding operation on the upstroke of the differential members 70.

In adding operations, the total controlling lever 44 (Fig. 1) being in its "add" position, the amount keys 40 representing the amount to be added are depressed, also the clerk's key 41 of the clerk operating the machine, which key selects a totalizer (Fig. 2) into which the amount is to be added, and the department key 43, after which operator depresses the motor bar 45 to release the machine.

Depression of the motor bar 45 trips the release shaft 65 (Figs. 3 and 8), whereupon a strong spring 242 (Fig. 8) mounted on a link 243 compressed on the previous operation, is freed to rock the release shaft 65 clockwise to release the machine for operation. The release shaft 65 disengages the usual clutch detent (not shown) and permits the motor circuit to be closed, all of which is fully explained in the patents to Shipley, No. 1,619,796, March 1, 1927, and No. 1,602,596, October 12, 1926.

The spring 242 presses against an arm 246 connected with the link 243 by a stud 245 entered in a slot 239 in the link, and upon the release of the shaft 65, the stud 245 shifts to the upper end of the slot 239 in the link 243.

In adding operations, the main drive shaft 73 makes a single rotation only, at the end of which the clutch detent is restored to effective position to arrest the motor, the motor circuit is interrupted, and the release shaft 65 returned to its position of rest.

The mechanism for restoring the release shaft 65 includes a large gear 247 (Fig. 8) driven by a pinion 255 on the drive shaft 73 and loosely mounted on a stud 248, supported in the right side frame 30 of the machine. A cam slot 249 formed in the side of the gear 247 guides a roller 250 carried by a restoring arm 251 pivoted at 252 to the right side frame of the machine. The rear end of the restoring arm 251 carries a stud 253 normally projecting into the shorter arm of an angular opening 264 formed in the link 243. The gear 247 turns through one-half of one counter-clockwise rotation on each adding operation of the machine. As the driven gear 247 approaches the end of its half rotation, a node 256 of the cam slot 249 engages the roller 250 on the restoring arm 251 and rocks the arm 251 clockwise, which, through its connection with the link 243, draws the link and its stud 245 downwardly and rocks the release shaft 65 counter-clockwise a distance sufficient to engage the clutch detent or motor locking arm (not shown) with the clutch, to arrest the machine in its home position.

*Total and sub-total taking mechanism*

In sub-totaling and totaling operations, the total control lever 44 is adjusted to its "read" or "reset" position, the desired totalizer selecting (clerk's) key 41 depressed, and the motor bar 45 operated.

In order to restore any transfer devices which may have been tripped on the preceding operation, and also because it is necessary to allow sufficient time for the selection by the machine, of the desired totalizer, and for the engagement and disengagement of such selected totalizer with the actuators on total and sub-total taking operations, the main drive shaft 73 is given two continuous rotations instead of one, as in adding operations. During the first rotation of the main drive shaft 73, the tripped transfer devices are restored, the desired totalizer is automatically selected and said selected totalizer is automatically moved into engagement with the actuators 110. On the second rotation of the main drive shaft, the totalizer pinions 111 control the extent of movement of the differentially movable members, thereby controlling the amount set up on the indicators (not shown), and type wheels (also not shown) in the usual manner.

To prevent the restoration of the release shaft 65 at the end of the first half rotation of the gear 247, on total and sub-total taking operations, the link 243 is rocked to the left to position the longer leg of the opening 254 in the path of the stud 253 on the restoring arm 251 to prevent the downward movement of the link 243 when the restoring arm 251 is rocked downwardly by the node 256 in the gear 247.

A pitman 257 slotted longitudinally intermediate its ends to embrace the stud 248, carries a pin 258, which projects through a slot 259 in the link 243. One end of the pitman 257 is pivoted to one end of a lever 260, fulcrumed at 252. A link 261 connects the opposite end of the lever 260 to an arm 262 pinned to a shaft 263. The shaft 263 is mounted in the side frames 30 of the machine and is given an initial clockwise movement by the movement of the total control lever 44 in either direction from the "add" position, as illustrated diagrammatically in Fig. 1 by mechanism presently to be described. This initial clockwise movement of the shaft 263, transmitted through the arm 262, link 261, and lever 260, slides the pitman 257 to the left (Fig. 8), carrying with it the link 243 to position the longer leg of the opening 254 in the path of the stud 253, as above described, to prevent restoration of the shaft 65, near the end of the first cycle of the machine in total and sub-total taking operations.

The mechanism by which the total control lever 44 rocks the shaft 263 will now be described. Integral with the total control lever 44 is a disk 270 (Figs. 7 and 9) pivoted on a stud 271 supported in the right side frame (not shown) of the machine. The disk 270 has formed therein a cam slot 272 into which projects a stud 273 carried by a bell crank 274 pivoted at 275 to the right side frame of the machine. An arm 277 is also pivoted at 275, a spring 276 being interposed between the bell crank 274 and the arm 277 to hold these parts as far apart as is permitted by a slot and pin connection 281. A cam slot 278 formed in the arm 277 accommodates a stud 279 carried by an arm 280 pinned to the previously mentioned shaft 263. It can be seen from Fig. 9, that movement of the total control lever 44 in either direction from the intermediate position illustrated, will rock the arm 274 counter-clockwise, which movement is communicated through the spring 276 to rock the arm 277 counter-clockwise. This counter-clockwise movement of the arm 277 rocks the arm 280 clockwise, and with it the shaft 263, to shift the restoring link 243 so as to locate the stud 253 of the restoring arm 251 in the longer leg of the opening 254 to prevent its effective operation.

Just before the end of the first cycle of rotation of the main drive shaft 73 on a total or sub-total taking operation, the shaft 263 is given an additional clockwise movement for reasons to be hereinafter described. The mechanism for imparting the additional movement to the shaft 263 includes a normally inactive cam disk 283 (Fig. 8) journaled on the stud 248. A slide 283 (see dotted lines Fig. 8) reciprocable in a groove formed diametrically across the rear face of the cam disk 282, carries a laterally and outwardly projecting lip 285, extending outwardly and straddled by a pair of studs 284 on the rear face of the pitman 257. When the pitman 257 is given its initial movement to the left (Fig. 8) by the total lever, as above described, it shifts the slide 283 to the left into engagement with a recess formed in the gear 247, thereby connecting the gear 247 and the cam disk 282 in such a manner that they will rotate in unison. Furthermore, a stud 286 mounted in the pitman 257 and normally seated in a notch formed in a cam groove 287 in the normally idle cam disk 282, is drawn into effective position within the groove 287 when the pitman 257 is moved to the left by movement of the total control lever 44. The configuration of the cam groove 287 is such that near the end of the first cycle of operation, the pitman 257 will be moved an additional distance to the left, and this second movement of the pitman 257 rocks the shaft 263 an additional distance in clockwise direction, for the purpose of changing the timing of the engagement and disengagement of the selected totalizer with the actuators 110, as will be hereinafter described.

*Totalizer engaging on total taking operations*

On total taking operations it is desired to reversely rotate the totalizer pinions 111 to their zero positions, and then disengage the totalizer from the actuators, to leave the totalizer pinions at zero. To do this, it is necessary to engage the totalizer pinions of the selected totalizer with the actuator racks 110 before the actuator racks rock clockwise on the second cycle of the total or sub-total taking operation, so that the racks are adjusted differentially under control of the totalizer pinions as they reversely rotate the pinions to zero. This is effected by changing the timing of the totalizer engaging and disengaging mechanism on such total taking operations. The mechanism whereby this result is accomplished will now be described.

It will be recalled that the pitman 233 (Fig. 7) is slidable on a stud 234 carried by a rocker 235. This rocker 235 is pivoted on a stud 290 supported in the right side frame (not shown) of the machine. Also pivoted on the stud 290 is an arm 291, carrying a stud 292, which projects through a cam slot 293 formed in the total control disk 270. One end of a link 295 carries a stud 294 which projects through a slot 296 in the arm 291 and also through a cam slot 297 formed in the rocker 235. The link 295, which carries the stud 294, is connected at its opposite end to the arm 280, previously described, which is pinned to the shaft 263. It will be remembered that when the machine is conditioned for a total taking operation, by shifting the total control lever 44 (Figs. 1, 7 and 9) to the reset position, the shaft 263 is given an initial clockwise movement. This movement of the shaft, and consequently of the arm 280 (Fig. 7) pinned thereto, lowers the link 295 and draws the stud 294 downwardly in the slots 296 and 297. However, this initial movement lowers the stud 294 only to the end of the straight portion of the cam slot 297, and therefore, does not affect the rocker 235. The movement of the total control lever 44 to the reset position, however, due to the cam slot 293 in the disk 270, will rock the arm 291 clockwise, which, due to engagement of the stud 294 with the slot 296 in this arm and with the cam slot 297 in the rocker 235, will turn the rocker 235 clockwise. The clockwise movement of the rocker 235, through the stud 234, lowers the pitman 233 and disconnects the notch of the pitman 233 from the stud 241 in the totalizer-engaging and disengaging spider 225, but the pitman 233 will not be shifted sufficiently at this time, to engage its notch 300 with the stud 301 on the opposite side of the fulcrum 271 of the totalizer-engaging and disengaging spider 225. Hence during the first cycle of operation in totaling and sub-totaling, the totalizer pinions 111 will not be engaged with their actuating racks 110. However, it will be remembered that during the first cycle of operation in totaling and sub-totaling, the shaft 263 and arm 280 receive an additional clockwise movement through the mechanism shown in Fig. 8. This additional movement of the arm 280 lowers the link 295 to cause the stud 294 to traverse the cam portion of the cam slot 297, and since the slot 296 in the arm 291 is straight, this additional downward movement of the stud 294 will turn the rocker 235 an additional distance in a clockwise direction, which will further lower the pitman 233. In the meantime, the drive cam 229 has rotated a distance sufficient to slide the pitman 233 to the right (Fig. 7) to a position wherein the notch 300 formed in the lower edge of the pitman 233 is immediately above the stud 301 mounted in the totalizer-engaging and disengaging spider 225. It can be seen that the additional lowering of the pitman 233 at this time will engage the notch 300 with the stud 301, thereby forming an operative connection between the totalizer-engaging and disengaging spider and its actuating pitman 233. When, near the end of the first cycle of operation, the drive cam 229 moves the pitman 233 to the left, the totalizer-engaging and disengaging spider 225 will be rocked clockwise, thereby raising the link 227 and rocking the arm 221 counter-clockwise to engage the selected totalizer 111 with the actuators 110. Early in the second cycle of operation, the actuator racks 110 will be rocked upwardly under control of the totalizer pinions 111, to restore the totalizer pinions to their zero positions. The pinions 111 are arrested in their zero positions against farther reverse rotation by means well known in the art, and not herein disclosed, and in turn, arrest the actuators 110 in the various positions corresponding to the values of the digits formerly registered on the totalizer pinions. In other words, the amount registered on the pinions has been loaded onto the actuators and the pinions are clear. Obviously, the actuators 110 as they rock upwardly until arrested by the means (not shown) which arrests the totalizer pinions 111 in their zero positions, will carry with them the beams 94 (Fig. 3) through which the differential links 95 are adjusted under control of the drive cams 72, so that by the time the second cycle of operation is about half completed, the differential links 95, with their connected indicating and printing mechanisms, have been set to indicate and record the total accumulated on the selected totalizer. Not only that, but the springs 116 will have caused the forked arms 114 of the stop sectors 113 to follow the movements of the differential links 95 to effect a similar adjustment of the stop sectors 113.

After these adjustments have occurred, the drive cam 229 (Fig. 7) shifts the pitman 233 to the right, and as the notch 300 of the pitman is still in engagement with the stud 301 on the totalizer-engaging and disengaging spider 225, the latter is rocked counter-clockwise to lower the link 227 and disengage the totalizer pinions 111 from the actuators 110, leaving the totalizer pinions in their zero positions. The differentially movable actuators 110 (Fig. 3) are then restored to their normal positions by the drive segments 71, as heretofore explained, leaving the stop sectors 113, the differentially adjustable links 95 and their associated mechanisms in the positions to which they were adjusted under control of the totalizer pinions 111. Near the end of the second cycle of operation, the cam disk 282 (Fig. 8) moves the pitman 257 to the right, thus rocking the shaft 263 counter-clockwise, which movement raises the link 295 (Fig. 7), thereby returning the stud 294 to the upper ends of the slots 296 and 297 in the arm 291 and rocker 235. The stud 294 in retracing its path through the cam slot 297 of the rocker 235, restores the rocker to normal position counter-clockwise. As the rocker restores, its stud 234 raises the pitman 233 to disengage the notch 300 thereof from the stud 301 on the totalizer-engaging and disengaging spider 225, after which the drive cam 229 moves the pitman to the left, to a position wherein the notch 240 is immediately beneath the stud 241 on the opposite side of the fulcrum of the spider 225. After the machine is brought to rest in its home position, the total control lever 44 is manually restored to its "add" position, thereby rocking the arm 291 counter-clockwise, which, through the stud 294, shifts the rocker 235 counter-clockwise and raises the pitman 233 to engage its notch 240 with the stud 241 in the totalizer-engaging and disengaging spider, in which position the totalizer-engaging mechanism is ready for an adding operation or a repeat operation.

The stop sectors 113 (Fig. 3) at the end of the totaling or sub-totaling operations, occupy positions substantially corresponding to the total amount just previously handled. Consequently, depression of the repeat key 46 at this time will lock the stop sectors in positions to arrest the disks 93 and enforce the disconnection of the latches 85 at points corresponding with the total amount, the differential members 70 being arrested with the disks 93.

As a result of an operation of the machine under the above conditions, the total amount just previously handled becomes an item which may be added on any selected totalizer, whether on the same line with that totalizer on which the amount was originally registered.

*Totalizer engaging on sub-total taking operations*

The movement of the parts described above is somewhat different on sub-total taking operations in that it is desired to have the totalizer pinions 111 remain in engagement with the actuators 110 when the latter are restored to their normal positions, so that the amounts taken from the totalizer pinions may be returned thereto. The movement of the total control lever 44 to the "read" position (Fig. 1) is a clockwise movement, as viewed in Fig. 7. It can be seen by reference to this figure, that the shape of the slot 293 in the total lever control disk 270 is such that on the clockwise movement of the total lever 44, the arm 291 will not be affected. Likewise the rocker 235 and the pitman 233 will not be effected by the clockwise movement of the total control lever. As the pitman 233 (Fig. 7) is not disconnected from the totalizer-engaging spider 225, preparatory to a sub-total taking operation, the spider 225 will be rocked clockwise to engage the selected totalizer with the actuators at the regular time, on the first cycle of operation. However, on the first cycle of operation in both total taking and sub-total taking, the actuators 110 do not move upwardly past their zero positions, due to the fact that the latches 85 (Fig. 3) are disconnected by the zero stop pawls 62, there having been no key depressed in the amount banks. It will be recalled that after the drive cams 229 (Fig. 7) have shifted the pitman 233 to the right, the shaft 263 and arms 280 lower the link 295 and the stud 294 into the cam portion of the slot 297, thereby turning the rocker 235 clockwise to lower the pitman 233 to disengage said pitman from the totalizer-engaging and disengaging spider 225. Near the end of the first cycle of operation, the pitman 233 is shifted to the left. This movement will be idle, as the pitman is disconnected from the totalizer-engaging and disengaging spider 225. Shortly after the beginning of the second cycle, the pitman 233 will be returned idly to the right to position the notch 240 of the pitman in line with the stud 241 in the spider 225, after which the link 295 and stud 294 are raised to swing the rocker 235 counter-clockwise and re-engage the pitman 233 with the spider 245. The pitman 233 is then again moved to the left, this time rocking the totalizer-engaging and disengaging spider 225 counter-clockwise to lower the link 227 and disengage the selected totalizer from the actuators.

Shortly after the arrest of the differential actuators 110 by the zero stop pawls 62 (Fig. 3) on the first cycle of operation, the stop pawls are rocked to their ineffective positions, in a manner as hereinafter explained. At the beginning of the second cycle of operation, the actuators are adjusted differentially under control of the totalizer pinions, thereby differentially adjusting the links 95, indicators and type wheels, and the stop sectors 113 to correspond with the amount which was on the totalizer pinions. In sub-totaling, the actuators 110 are then restored to their normal positions before the totalizer is disengaged therefrom, thus restoring to the totalizer pinions 111 the amount which was taken therefrom. Then, near the end of the second cycle, the pitman 233 (Fig. 7) shifts to the left to its normal position, as shown in Fig. 7, to rock the totalizer-engaging and disengaging spider 225 counter-clockwise and disengage the totalizers from their actuators.

Mechanism will now be described for rocking the zero stop pawls 62 (Fig. 3) to their ineffective positions on total and sub-total taking operations. It will be recalled that the shaft 263 is given two successive clockwise movements on a total taking operation, the first by the manual positioning of the total control lever 44, preparatory to taking the total or sub-total from the totalizer, and the second by the mechanism illustrated in Figure 8 during the first cycle of a totaling or sub-totaling operation. A plurality of arms 302 (Fig. 3) pinned to the shaft 263 carry a disabling bail 303. This bail is common to all of the tails 63 on the arms 60, which arms are pinned to the same shafts 61 upon which are pinned the zero stop pawls 62. The first clockwise movement of the shaft 263 and the bail 303 (Fig. 3) upon the manual adjustment of the total control lever 44, will position the bail 303 immediately above, but not in contact with the tails 63. The second clockwise movement of the shaft 263 occurring during the first cycle of a total or sub-total taking operation, will cause the bail 303 to rock the tails 63, arms 60, and zero stop pawls 62 counter-clockwise to positions in which the stop pawls 62 are ineffective to disconnect the latches 85 of the differential members 70 from their driving segments 71. After the return of the totalizer actuators to their normal positions near the end of the second cycle of a total or sub-total taking operation, the shaft 263 is rocked counter-clockwise to withdraw the bail 303 to idle position, and enable the springs 64 to restore the zero stop pawls 62 to their normal effective positions.

*Operation*

A general review of the operation of the machine will now be given. Let it be assumed that clerk "A" in department "14" wishes to register a sale of $23.50. As the clerk approaches the cash register, he looks to see if the total control lever 44 is in the "add" position. If the total control lever is in either the "read" or "reset" positions, he moves it to the "add" position. He then sets up the amount, $23.50, on the amount keyboard by depressing the proper amount keys 40, then depresses the "A" clerk's key 41, the "14" key in the department bank 43, and finally the motor release bar 45, which releases the machine for operation. The actuators 110 are then differentially adjusted according to the amount, $23.50, set up on the keyboard, after which the totalizer 111 selected by the clerk's key is engaged with the actuators. The actuators are then restored to their normal positions, accumulating upon the totalizer the amount represented by the amount keys depressed. The totalizer is then disengaged from the actuators, leaving the indicators and the printing devices in the positions to which they were adjusted.

Assume now that clerk "K" in department "13" desires to enter a like amount, that is, $23.50, into the machine. As clerk "K" approaches the register, he sees by glancing at the indicators that the amount, $23.50, which he wishes to enter in the machine, was registered in the machine on the last operation. He then depresses the "K" key 41, the "13" key 43, the repeat key 46, and the motor bar 45, which latter releases the machine for operation. The stop sectors 113 (Fig. 3) were differentially adjusted on the previous operation in accordance with the values of the amount keys depressed, that is, $23.50, and remained in their adjusted positions after the restoration of the actuators to their home positions. Depression of the repeat key 46, therefore, locks these sectors in their adjusted positions. The actuators 110 are then differentially arrested under control of these stop sectors 113, and at the same time, the clerk "K" totalizer is selected, after which the totalizer is engaged with the actuators. The actuators are then restored to their normal positions as in a key-controlled adding operation, to add the amount of $23.50 on the "K" totalizer, after which the totalizer is disengaged from the actuators and the machine brought to rest in its home position.

On total and sub-total taking operations, as above described, the actuators, and the differentially adjustable stop sectors 113, are variously positioned according to the value of the amount registered on the selected totalizer from which the total or sub-total is taken, and under the control of the totalizer. If, after a total has been taken from the totalizer selected by one of the clerk's keys 41, and the total control lever 44 returned to its "add" position, the repeat key 46 and the motor bar 45 are depressed, the amount of the last total will be added into the totalizer in the zero position, indicated by the dotted circle in Fig. 1. This totalizer is known herein as the grand totalizer. It can be seen that at the end of the day's business, the proprietor, by the use of the repeat key 46, and by taking the total of each of the clerks' totalizers and transferring the totals successively from all of the clerks' totalizers to the grand totalizer, can thereby obtain a grand total of the day's business. To take the total from the grand totalizer, the operator moves the total lever 44 to the "reset" position, depresses the "total" key 42 (Fig. 1), and then the motor bar 45. The key 42 and motor bar 45 release the machine, and during the operation, due to the fact that none of the clerks' keys 41 is depressed, the differential for the clerks' bank stops at zero, thus selecting the grand totalizer to have the amount thereon cleared therefrom, and that amount printed and indicated. Obviously, the total represented by the adjusted stop sectors 113 can be transferred to any totalizer, determined by the clerk's key depressed on the same line with that totalizer from which the total was taken.

*Operating mechanism*

The machine may be operated by an electric motor of any suitable design. The motor is geared to the main drive shaft 73 and imparts to this shaft the required number of rotations through a suitable clutch mechanism (not shown).

The machine may also be operated manually by a crank, shown in dotted lines in Fig. 8. This crank rotates a gear 310 mounted on a stud 311 projecting from the right side frame of the machine. The gear 310 meshes with the gear 247 on the stud 248. The ratio of these gears is such that two clockwise rotations of the crank and the gear 310 will impart one-half of one counter-clockwise rotation to the gear 247, and one clockwise rotation to the gear 255 on the main drive shaft 73.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What I claim as new is:—

1. In a machine of the class described, the combination with a plurality of totalizers; and means for taking the total from any one of said totalizers; of manipulative means operable after the total taking operation, for causing the total taken from the totalizer to be accumulated upon any other totalizer; and separate and independently operable manipulative means to select the totalizer from which the total is to be taken, and to select the totalizer to which the total is to be transferred.

2. In a machine of the class described, the combination with a totalizer; a differentially movable actuator therefor; and manipulative means to control the differential movement of said actuator; of a stop member normally in position to be differentially adjusted under control of the manipulative means; and means to lock the stop member in its adjusted position to form a stop for the totalizer actuator on repeat operations.

3. In a machine of the class described, the combination with a totalizer; an actuator therefor; and manipulative means to control the extent of movement of said actuator; of a stop member normally in position to be differentially adjusted under control of the manipulative means; means operable after the manipulative means have been released, to lock the stop member in the position to which it was adjusted on the previous operation, to form an effective stop for the actuator on the succeeding operation.

4. In a machine of the class described, the combination with a plurality of totalizers; means to add amounts onto said totalizers; and manipulative means to control the amount to be added into the totalizers; of a stop member differentially adjusted under control of said manipulative means; manually operable means to lock the stop member in its adjusted position; means to select the totalizer into which is to be added the amount set up on the manipulative means, and to select any totalizer into which the same amount is to be added under control of the stop member on the succeeding operation.

5. In a machine of the class described, the combination with a plurality of totalizers, an actuator therefor, adapted to accumulate amounts on and restore the totalizers to zero; of a stop member for the actuator, means to differentially adjust the stop member under the control of the totalizer pinion according to the amount taken from the totalizer zeroized, means to lock the stop member in its adjusted position to form a stop for the actuator on the succeeding operation, to add the amount which was on the zeroized totalizer, upon any totalizer; and means to select the totalizer to be zeroized, and to select the totalizer upon which the amount derived from the zeroized totalizer is to be added.

6. In a machine of the class described, the combination with a totalizer; and an actuator therefor; of a stop member for said actuator; a plurality of means to control the adjustment of said stop member; means operable after the stop member is adjusted, to shift the stop member to, and lock it in its effective position, wherein said stop member is adapted to control the movement of the actuator on the next succeeding operation.

7. In a repeat mechanism, the combination with a totalizer actuator; of a normally unlocked stop member for the actuator; manipulative means to determine the length of movement of the actuator and stop member; and means operable after the completion of the operation during which the actuator is restored to normal position, to lock the stop member in its adjusted position to form an effective stop for said actuator upon the succeeding operation.

8. In a repeat mechanism, the combination with a totalizer actuator; of a normally ineffective stop member for said actuator; a plurality of manipulative means to control the amount of movement of the actuator and the stop member; an arm for said stop member; and a manually operable lever to rock the arm to move the stop member to, and lock them in its effective position.

9. In a machine of the class described, the combination with a totalizer; a differentially adjustable actuator therefor; and manipulative means to control the actuator in adding operations; of differential arresting means normally free and adjustable with the actuator on every adding operation; and means optionally operable subsequently to the operation in which said arresting means is adjusted, to render the arresting means effective to arrest the differentially adjustable actuator during the succeeding operation.

10. In a machine of the class described adapted for adding, totaling and sub-totaling operations, the combination with a plurality of totalizers; and a differentially adjustable actuator therefor; of a differential or arresting means adjustable with the actuator on every adding operation thereof, and normally ineffective to arrest the actuator; and means to render the arresting means effective to arrest the actuator subsequently to a totaling operation to transfer an amount from one totalizer to another.

11. In a machine of the class described, the combination with a totalizer; a differentially adjustable actuator therefor; and differentially adjustable connecting means controlled by the actuator; of a differentially adjustable stop member having a loose connection with the connecting means; resilient means to maintain a predetermined relation between the stop member and the connecting means; in which the arresting means is ineffective relatively to the actuator; and means to vary the relation of the stop member to the connecting means to render the arresting means effective relatively to the actuator.

12. In a machine of the class described, the combination with a totalizer; and a differentially adjustable actuator therefor; of a differentially adjustable stop member; means to normally maintain a predetermined relation between the stop member and the actuator wherein the stop member while differentially adjustable remains ineffective relatively to the actuator; and means operable subsequently to any operation of the machine to vary the relation between the stop member and actuator to render the stop member effective relatively to the actuator.

13. In a machine of the class described, the combination with a totalizer; and a differentially adjustable actuator therefor; of a differentially adjustable stop member; means to normally maintain a predetermined relation between the stop member and the actuator wherein the stop member while differentially adjustable remains ineffective relatively to the actuator; and means to shift the stop member a predetermined distance relatively to the actuator to enable the stop member to arrest the actuator.

14. In a machine of the class described, the combination with a totalizer; and a differentially adjustable actuator therefor; of a differentially adjustable stop member; means to normally maintain a predetermined relation between the stop member and the actuator wherein the stop member while differentially adjustable remains ineffective relatively to the actuator; and means to shift the stop member relatively to the actuator and to lock the stop member in its shifted position to enable the stop member to arrest the actuator.

15. In a machine of the class described, the combination with a totalizer; and a differentially adjustable actuator therefor; of a stop member normally adjustable by the actuator at each operation of the machine, and ineffective relatively to the actuator; and means operable subsequently to any operation of the machine to render the stop member effective relatively to the actuator.

16. In a machine of the class described, the combination with a totalizer; and a differentially adjustable actuator therefor; of a notched stop member associated with the actuator and adjustable thereby; and means to lock the stop member to arrest the actuator.

17. In a machine of the class described, the combination with a totalizer; a differentially adjustable actuator therefor; and manipulative means to control the adjustment of the actuator in adding and totaling operations; of a stop member adjustable differentially by the actuator at each operation thereof, and normally ineffective relatively to the actuator; and means to shift the stop member to, and lock it in its effective position relatively to the actuator.

18. In a machine of the class described, the combination with a totalizer; and a differentially adjustable actuator therefor; of a notched stop member associated with the actuator and differentially adjusted thereby; and means associated with the stop member and engageable with the notches therein to lock the stop member in its effective positions relatively to the actuator.

19. In a machine of the class described, the combination with a totalizer; a differentially movable actuator therefor; and manipulative means to control the differential movements of said actuator; of stopping means mounted in axial alignment with the actuator, and differentially adjustable under control of the manipulative means; and a shiftable device operable to lock the stopping means in any of its adjusted positions to determine the movement of the actuator on the succeeding operation of the machine.

20. In a machine of the class described, the combination with a totalizer; a differentially movable actuator therefor; and manipulative means to control the differential movements of said actuator; of stopping means mounted in axial alignment with the actuator, and differentially adjustable under control of the manipulative means; and a shiftable device mounted in axial alignment with the actuator, and operable to lock the stopping means in any of its adjusted positions to determine the movement of the actuator on the succeeding operation of the machine.

21. In a machine of the class described, the combination with a totalizer; a differentially movable actuator therefor; and manipulative means to control the differential movements of said actuator; of stopping means mounted in axial alignment with the actuators, and differentially adjustable under control of the manipulative means; a shiftable device mounted in axial alignment with the actuator, and operable to lock the stopping means in any of its adjusted positions; and means to maintain the shiftable device in its shifted position, whereby the actuator receives a movement on the succeeding operation of the machine under control of the stopping means.

22. In a machine of the class described, the combination with a totalizer; a differentially movable actuator therefor; and manipulative means to control the differential movements of said actuator; of stopping means mounted in axial alignment with the actuator, and differentially adjustable under control of the manipulative means; a shiftable device having an effective position and an ineffective position, and being operable to lock the stopping means in any one of its adjusted positions when moved from its ineffective to its effective position; a pivoted member to retain the device in its effective position when moved thereto; a detent to maintain the pivoted member in its retaining position; and means on the device to move the pivoted member into position to be held by the detent when the shiftable device is moved into its effective position so that the stopping means is positively held throughout the succeeding operation to control the movement of the actuator during such operation.

In testimony whereof I affix my signature.

WILLIAM H. ROBERTSON.